US009350392B2

(12) United States Patent
Lin et al.

(10) Patent No.: US 9,350,392 B2
(45) Date of Patent: May 24, 2016

(54) RFIC CONFIGURATION FOR REDUCED ANTENNA TRACE LOSS

(71) Applicant: QUALCOMM Incorporated, San Diego, CA (US)

(72) Inventors: I-Hsiang Lin, Los Altos, CA (US); Zhijie Xiong, San Jose, CA (US); Seshagiri Krishnamoorthy, San Diego, CA (US); Jin-Su Ko, San Jose, CA (US); Prashanth Akula, San Diego, CA (US); Liang Zhao, Sunnyvale, CA (US); Kevin Hsi Huai Wang, San Diego, CA (US); Desong Zhao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/712,607

(22) Filed: Dec. 12, 2012

(65) Prior Publication Data

US 2014/0162570 A1    Jun. 12, 2014

(51) Int. Cl.
*H04B 1/28*    (2006.01)
*H04B 1/00*    (2006.01)

(52) U.S. Cl.
CPC ............................... *H04B 1/0064* (2013.01)

(58) Field of Classification Search
CPC ....................... H04B 7/0404; H04B 7/0874
USPC .................. 455/41.2, 333, 562.1, 272
See application file for complete search history.

(56) References Cited

U.S. PATENT DOCUMENTS

| 6,882,829 | B2 | 4/2005 | Mostov et al. |
| 7,643,848 | B2 | 1/2010 | Robinett |
| 7,953,368 | B2 | 5/2011 | Miwa et al. |
| 8,130,787 | B2 | 3/2012 | Hagiwara et al. |
| 8,174,385 | B2 * | 5/2012 | Perng et al. ................. 340/572.1 |
| 8,314,706 | B2 * | 11/2012 | Oberle ....................... 340/572.7 |
| 2004/0224652 | A1 | 11/2004 | Hara |
| 2005/0093132 | A1 | 5/2005 | Khorram |
| 2010/0111046 | A1 | 5/2010 | Van Rooyen |
| 2013/0003783 | A1 | 1/2013 | Gudem et al. |

FOREIGN PATENT DOCUMENTS

WO    0249153 A1    6/2002

OTHER PUBLICATIONS

International Search Report and Written Opinion—PCT/US2013/074823—ISA/EPO—Sep. 5, 2014.

* cited by examiner

*Primary Examiner* — Eugene Yun
(74) *Attorney, Agent, or Firm* — Liberty E. Mann

(57) ABSTRACT

An RFIC configuration for reduced antenna trace loss is disclosed. In an exemplary embodiment, an apparatus includes a primary RFIC and a secondary RFIC that is configured to receive analog signals from at least two antennas. The secondary RFIC is configured to process selected analog signals received from at least one antenna to generate an analog output that is input to the primary RFIC.

20 Claims, 3 Drawing Sheets

FIG. 2

RFIC CONFIGURATION FOR REDUCED ANTENNA TRACE LOSS

BACKGROUND

1. Field

The present application relates generally to the operation and design of wireless devices, and more particularly, to the configuration of radio frequency integrated circuit components for improved performance of a wireless device.

2. Background

Modern smart phones and other portable devices have extended the use of different wireless links with a variety of technologies in different radio frequency bands. Intense integration of multiple transceivers in one radio frequency integrated circuit (RFIC) chip or in one small module is increasingly required by consumer markets. However, as chips and modules get smaller, antenna dimensions remain fixed due to the frequency bands in which they operate. Although antenna sharing is common, a typical smart phone may include two or more antennas to receive and transmit signals in various frequency bands. Inevitably, at least one of the antennas is located far from the device's RFIC, and this distance introduces undesirable trace loss. By reducing trace loss, it is possible that signal quality and/or overall performance of the device with respect to a particular antenna or frequency band can be improved.

Accordingly, what is needed is an RFIC configuration to reduce trace loss in a multi-antenna wireless device.

BRIEF DESCRIPTION OF THE DRAWINGS

The foregoing aspects described herein will become more readily apparent by reference to the following description when taken in conjunction with the accompanying drawings wherein.

DETAILED DESCRIPTION

The detailed description set forth below in connection with the appended drawings is intended as a description of exemplary embodiments of the invention and is not intended to represent the only embodiments in which the invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well known structures and devices are shown in block diagram form in order to avoid obscuring the novelty of the exemplary embodiments presented herein.

Figure 1:
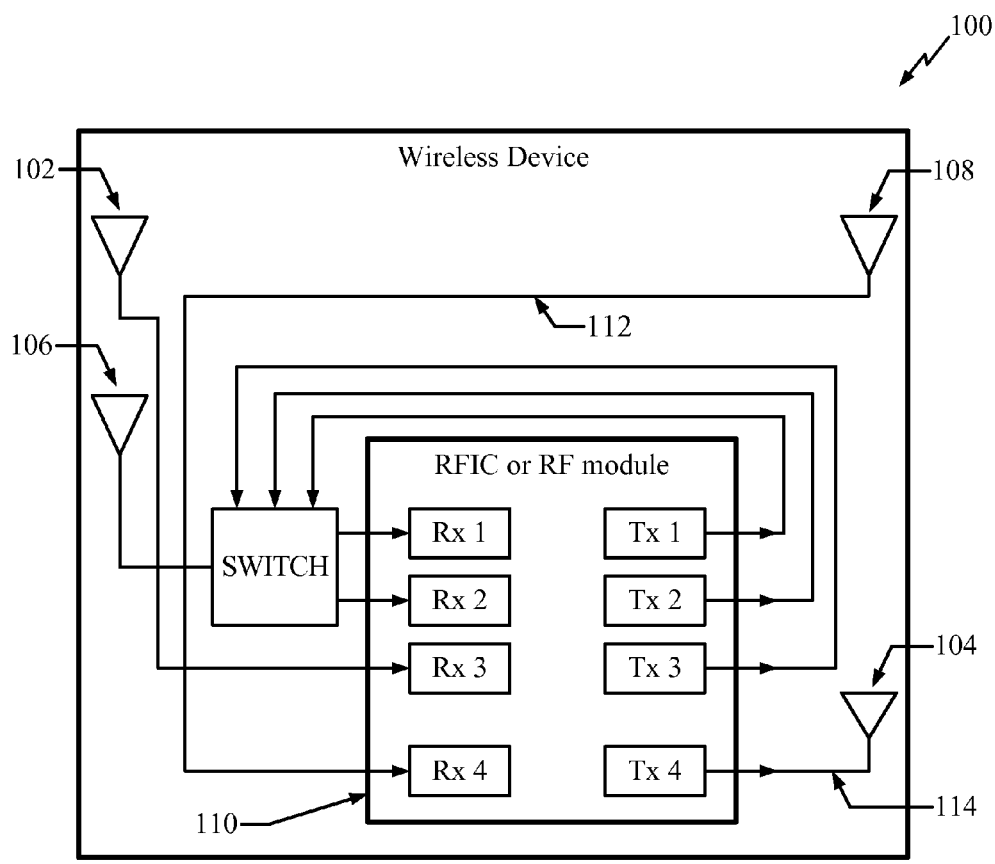
FIG. 1 illustrates a conventional device having multiple antennas configured to communicate in multiple RF bands.

FIG. 1 illustrates a conventional device 100 having multiple antennas configured to communicate in multiple RF bands. For example, the device 100 comprises a smart phone or other wireless device. The device 100 includes antennas 102, 104, 106, and 108. Each antenna has a corresponding signal trace connecting it to an RFIC 110 that is configured to receive and/or transmit signals over the antennas. For example, the signal traces may be routed on a circuit board or by dedicated connecting wires located within the device 100.

The size of the antennas may necessitate their locations within the device 100. Thus, is it possible that one or more of the antennas are located within the device 100 such that their corresponding signal traces to the RFIC 110 are long enough to experience significant trace loss. For example, the antenna 104 is located relatively close to the RFIC 110 and its corresponding signal trace 114 is relatively short compared to the longer signal trace 112 associated with the antenna 108. Longer signal traces lead may lead to unacceptable trace loss that degrades the performance of the device. Accordingly, in various exemplary embodiments, an RFIC configuration is provided to reduce antenna trace loss in multi-antenna devices.

Figure 2:
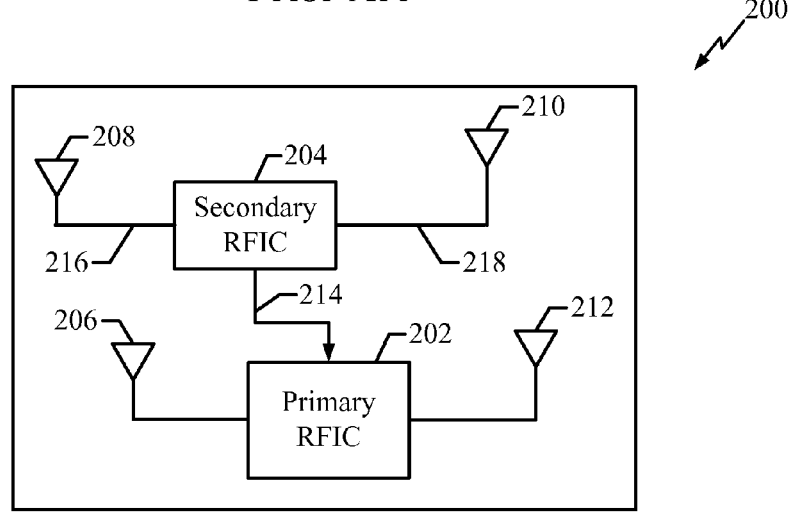
FIG. 2 shows a wireless device comprising an exemplary embodiment of an RFIC configuration for reduced antenna trace loss.

FIG. 2 shows a wireless device 200 comprising an exemplary embodiment of an RFIC configuration for reduced antenna trace loss. The wireless device 200 comprises a primary RFIC 202 that is coupled to antennas 206, 212 to transmit and/or receive RF signals with external devices. The wireless device 200 also comprises a secondary RFIC 204 that is coupled to antennas 208, 210 through signal traces 216 and 218 to transmit and/or receive RF signals with external devices. In exemplary embodiments, the antennas 208 and 210 are configured for communication using one or more communication technologies. For example, the antenna 208 may be configured as a global navigation satellite system (GNSS) antenna to receive GNSS signals, and the antenna 210 may be configured as a wireless wide area network (WWAN) receiver (Rx) diversity antenna to communicate with a wide area network, for example, a cellular wide area network. It should be noted that the antennas 208 and 210 are not limited to any particular communication technology and may be configured for use with any wireless technology, such as GNSS, WWAN, wireless local area network (WLAN), WiFi® (designating products using the IEEE 802.11 family of standards), Bluetooth (a wireless technology standard for exchanging data over short distances), or any other wireless technology.

In an exemplary embodiment, the secondary RFIC 204 receives analog signals from at least two antennas (i.e., the antennas 208, 210) and processes one or both of these signals to produce at least one analog output signal 214 that is input to the primary RFIC 202. The analog output signal 214 may be further processed by the primary RFIC 202 as discussed in more detail below.

In an exemplary embodiment, the secondary RFIC 204 performs at least the following functions.

1. Receives signals from at least two antennas. Each antenna configured to communicate using a selected communication technology.
2. Provides processing of at least one of the received antenna signals (i.e, amplify, filter, down-convert, etc.).
3. Provides an analog output signal to the primary RFIC.
4. Is positioned closer to one or more of the at least two antennas than is the primary RFIC to reduce trace loss associated with the antenna signal paths.

In various exemplary embodiments, the novel RFIC configuration comprises the secondary RFIC 204 which is located within a wireless device so that trace loss associated with one or more antennas connected to the secondary RFIC can be reduced. For example, at least one of the signal traces 216 and 218 connecting the antennas 208 and 210 to the secondary RFIC 204 is shorter and experiences less trace loss than if these signal traces were extended to connect the antennas 208 and 210 to the primary RFIC 202. The shorter signal traces result in reduced trace loss.

Figure 3:
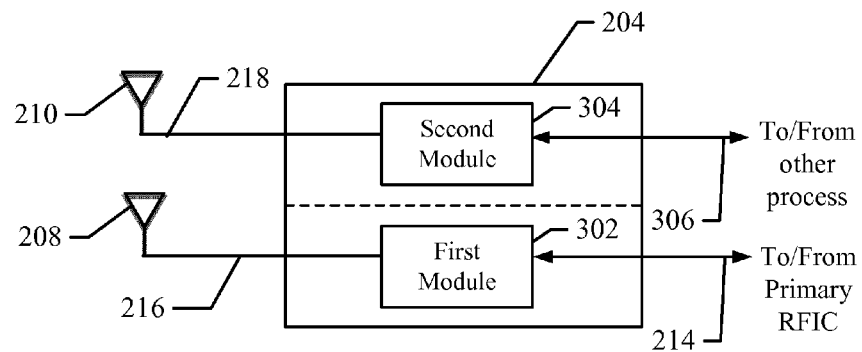
FIG. 3 shows an exemplary embodiment of the secondary RFIC.

FIG. 3 shows an exemplary embodiment of the secondary RFIC 204. The secondary RFIC 204 comprises a first module 302 and a second module 304. The first module 302 processes signals that flow to/from the antenna 208. The second module 304 processes signals that flow to/from the antenna 210. The antennas 208, 210 are configured to receive signals having the same or different frequency. The first module 302 communicates with the primary RFIC 202 (not shown) through communication line 214. The second module 304 communicates with other functional elements at the device through the communication line 306. In an exemplary embodiment, each module is configured to process at least one of global navigation satellite system (GNSS) signals, wireless wide area network (WWAN) communication signals, Wi-Fi communication signals, and Bluetooth communication signals. The antennas 208, 210 are configured to operate in the corresponding frequency bands.

In an exemplary embodiment, the first module 302 receives analog RF signals from the antenna 208 and processes these signals to generate the analog output 214. The processing includes but is not limited to amplification, filtering, down-converting or any other suitable process. The analog output 214 can be further processed by the primary RFIC. Thus, in an exemplary embodiment, the processing performed by the first module 302 comprises a sub-process associated with processing performed by the primary RFIC. In another exemplary embodiment, the first module 302 is coupled to multiple antennas. Thus, one or more antennas in addition to the antenna 208 are coupled to the first module 302. The first module 302 processes the multiple antennas coupled to it to generate the analog output 214 to the primary RFIC.

Accordingly, the secondary RFIC 204 is configured to process signals that flow to/from at least two antennas and provide a processed analog signal to the primary RFIC 202 using the communication line 214. This configuration allows the secondary RFIC 204 to be positioned within the device so that antenna traces to the secondary RFIC 204 are short. As a result, the shorter trace lengths result in reduced trace loss.

Figure 4:
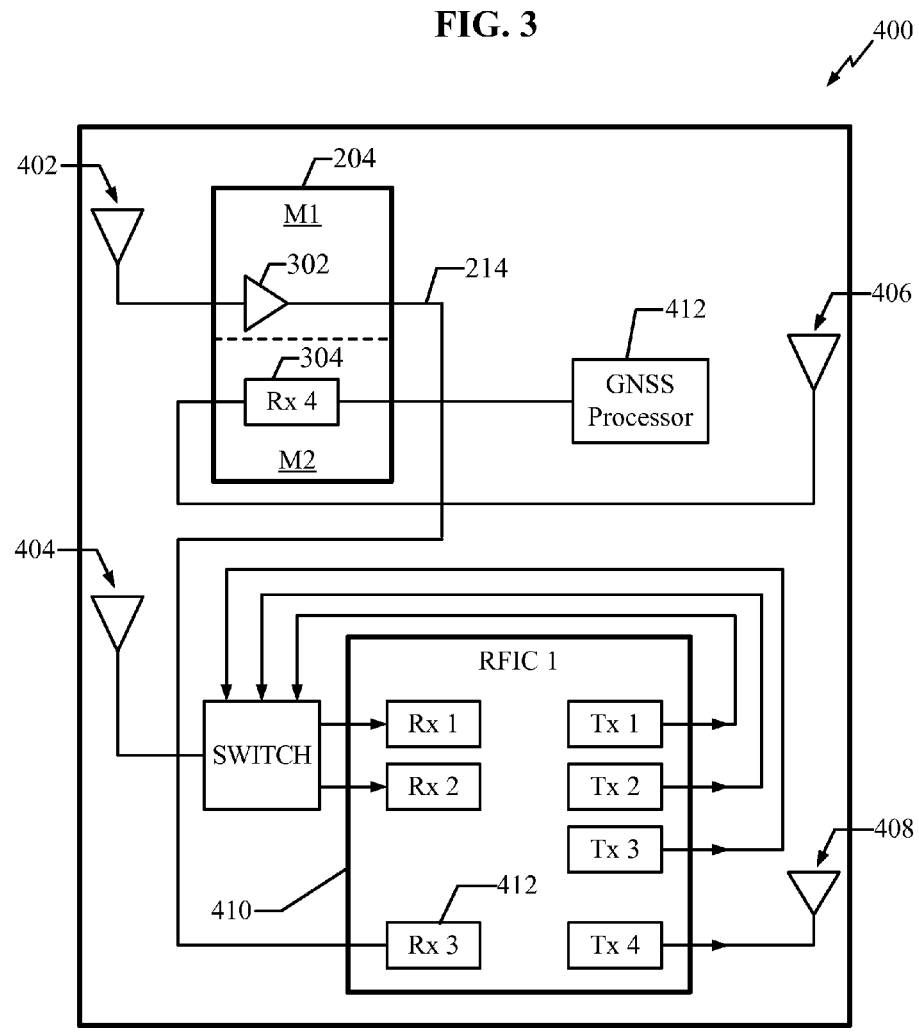
FIG. 4 shows a wireless device comprising an exemplary embodiment of an RFIC configuration for reduced antenna trace loss.

FIG. 4 shows a wireless device 400 comprising an exemplary embodiment of an RFIC configuration that includes the secondary RFIC 204 that provides reduced antenna trace loss. The device 400 comprises antennas 402, 404, 406, and 408. A primary RFIC 410 is configured to receive signals from antennas 404 and 408. The secondary RFIC 204 is configured to receive signals from antennas 402 and 406. In an exemplary embodiment, the secondary RFIC 204 includes a first module (M1) comprising an LNA 302 that processes signals received from the antenna 402 in a first frequency band. The secondary RFIC 204 also includes a second module (M2) that comprises a receive circuit 304 that processes signals received from the antenna 406 in a second frequency band. For example, the receive circuit 304 may be a GNSS receive circuit that processes GNSS signals received by the antenna 406. The processed GNSS signals are then passed to a GNSS processor 412 for further processing at the device 400. In another exemplary embodiment, the GNSS processor 412 is located at the receiver 304 so that the GNSS front end is located in the secondary RFIC 204. Thus, the secondary RFIC 204 is configured to comprise a variety of functional configurations to process analog signals associated with at least two antennas.

By including the secondary RFIC 204 in the device 400, various functions originally provided by the primary RFIC 410 can be partitioned to the secondary RFIC 204, which can be located closer to the appropriate antennas to reduce signal trace length and thereby reduce trace loss. For example, the secondary RFIC 204 is configured to process the analog antenna signals it receives from the antennas 402 and 406 and generate at least one analog output signal 214. For example, the secondary RFIC 204 may provide amplification, down-conversion, filtering and/or any other functions to process the received analog signals from two or more antennas to produce the analog output signal 214. In a specific implementation, the antenna 402 may be a GNSS antenna and its received signal may be amplified by the LNA 302. The analog output of the LNA 302 is transmitted to the primary RFIC 410 in the analog signal 214. The primary RFIC 410 comprises receiver 412 that receives the amplified analog signal and performs further processing. For example, the receiver 412 may be a GNSS front end processor that processes the amplified GNSS signal to perform position/location functions. Thus, in an exemplary embodiment, the processing performed by the first module 302 comprises a sub-process associated with processing performed by the receiver 412 of the primary RFIC 400.

The antenna 406 may be a WWAN Rx diversity antenna and its received signal may be input to the second module M2 which may comprise a WWAN Rx diversity receiver 304 configured to receive and down-convert a WWAN Rx diversity signal. By positioning the secondary RFIC 204 closer to at least one of the antennas 402 and 406, the trace loss associated with the input signal paths of the antennas 402, 406 is reduced as compared to the conventional device configuration shown in FIG. 1.

In another exemplary embodiment, the antenna 406 may be configured to receive WiFi signals and the receiver 304 is configured to process the received WiFi signals. Thus, the secondary RFIC 204 may receive and process signals associated with any communication or information technology. It should also be noted that the novel configuration is not limited to having only one secondary RFIC, such that any number of secondary RFICs can be utilized.

Accordingly, the novel RFIC configuration comprises at least one secondary RFIC configured to process analog signals from at least two antennas. The secondary RFIC is positioned close to its respective antennas to reduce trace length and thereby reduce trace loss. In various exemplary embodiments, one or more of the following features are provided by the novel RFIC configuration.

Figure 5:
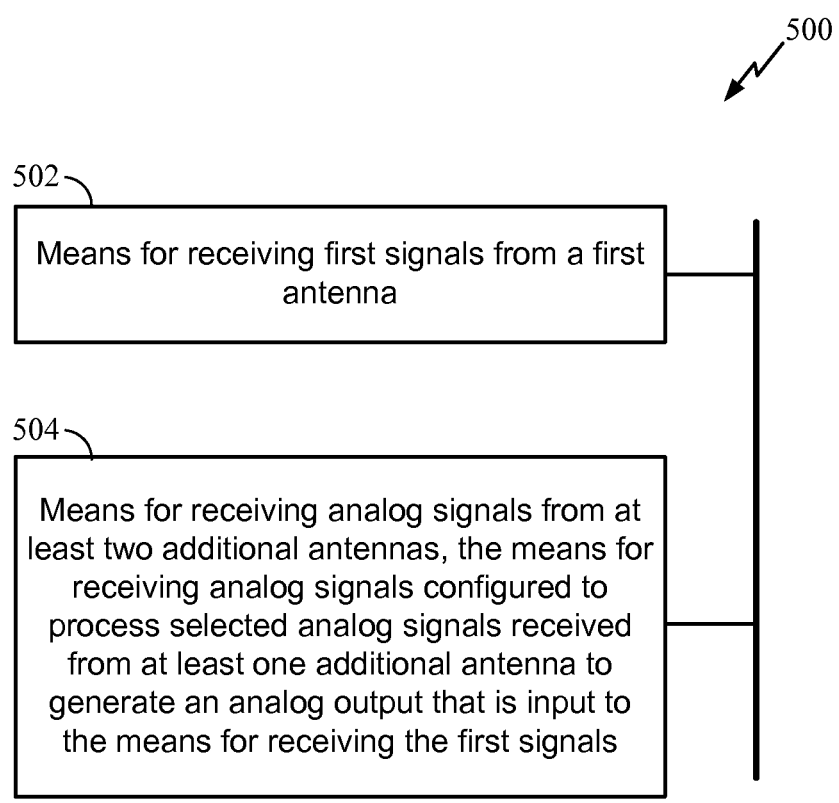
FIG. 5 shows an exemplary embodiment of an apparatus comprising an RFIC configuration for reduce antenna trace loss.

1. Antenna trace loss is reduced
2. Functions are partitioned between primary and secondary RFICs
3. Reduced cost and circuit board area
4. Secondary RFIC configured to provide processing for analog signals associated with at least two antennas
5. Secondary RFIC performs sub-processes for primary RFIC FIG. 5 shows an exemplary embodiment of an apparatus 500 comprising an RFIC configuration for reduce antenna trace loss. In an aspect, the apparatus 500 is implemented by one or more modules configured to provide the functions as described herein. For example, in an aspect, each module comprises hardware and/or hardware executing software.

The apparatus 500 comprises a first module comprising means (502) for receiving first signals from a first antenna, which in an aspect comprises the primary RFIC 202.

The apparatus 500 also comprises a second module comprising means (504) for receiving analog signals from at least two additional antennas, the means for receiving the analog signals configured to process selected analog signals received from at least one additional antenna to generate an analog output that is input to the means for receiving the first signals, which in an aspect comprises the secondary RFIC 204.

Those of skill in the art would understand that information and signals may be represented or processed using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. It is further noted that transistor types and technologies may be substituted, rearranged or otherwise modified to achieve the same results. For example, circuits shown utilizing PMOS transistors may be modified to use NMOS transistors and vice versa. Thus, the amplifiers disclosed herein may be realized using a variety of transistor types and technologies and are not limited to those transistor types and technologies illustrated in the Drawings. For example, transistors types such as BJT, GaAs, MOSFET or any other transistor technology may be used.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both non-transitory computer storage media and communication media including any medium that facilitates transfer of a computer program from one place to another. A non-transitory storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The description of the disclosed exemplary embodiments is provided to enable any person skilled in the art to make or use the invention. Various modifications to these exemplary embodiments will be readily apparent to those skilled in the art, and the generic principles defined herein may be applied to other embodiments without departing from the spirit or scope of the invention. Thus, the invention is not intended to be limited to the exemplary embodiments shown herein but is to be accorded the widest scope consistent with the principles and novel features disclosed herein.

What is claimed is:

1. An apparatus comprising:
   a secondary radio frequency integrated circuit (RFIC) coupled to at least a first antenna, the secondary RFIC configured to process analog signals received at the first antenna into an analog output signal; and
   a primary RFIC coupled to at least a second antenna, the primary RFIC configured to receive and to further process the analog output signal, the secondary RFIC positioned at a shorter trace length to the first antenna than the primary RFIC.

2. The apparatus of claim 1, the primary RFIC is coupled to receive signals from at least one additional antenna.

3. The apparatus of claim 1, the secondary RFIC comprising at least two modules coupled to the first antenna and a third antenna, respectively.

4. The apparatus of claim 3, at least one module of the at least two modules configured to process the analog signals received from the first antenna to generate the analog output signal.

5. The apparatus of claim 4, the at least one module configured to at least one of amplify, filter, downconvert, and up-convert.

6. The apparatus of claim 4, the at least one module comprises a sub-process associated with a process performed by the receiver of the primary RFIC.

7. The apparatus of claim 3, each module is configured to process at least one of global navigation satellite system (GNSS) signals, wireless wide area network (WWAN) communication signals, Wi-Fi communication signals, and Bluetooth communication signals.

8. The apparatus of claim 3, each of the at least two antennas is configured to receive signals in at least one of a global navigation satellite system (GNSS) frequency band, a wireless wide area network (WWAN) communication frequency band, a Wi-Fi communication band, and a Bluetooth communication band.

9. The apparatus of claim 3, the first antenna and the third antenna are configured to receive signals having the same or different frequency.

10. The apparatus of claim 1, the secondary RFIC positioned within the apparatus to reduce trace loss associated with the analog antenna signals output from the first antenna.

11. The apparatus of claim 1, wherein the secondary RFIC is configured to process the analog signals received at the first antenna using a sub-process associated with a process performed by the receiver of the primary RFIC, and wherein the primary RFIC is configured to process analog signals received at the second antenna using the sub-process.

12. An apparatus comprising:
a secondary means for processing analog signals received at a first antenna into an analog output signal, the secondary means for processing analog signals located in a secondary radio frequency integrated circuit (RFIC); and
a primary means for further processing the analog output signal and processing analog signals received at a second antenna, the primary means located in a primary RFIC, the secondary RFIC positioned at a shorter trace length to the first antenna than the primary RFIC.

13. The apparatus of claim 12, the secondary means for processing analog signals comprising at least two modules coupled to the first antenna and a third antenna, respectively.

14. The apparatus of claim 13, at least one module of the at least two modules configured to process the analog signals received from the first antenna to generate the analog output signal.

15. The apparatus of claim 14, the at least one module configured to at least one of amplify, filter, downconvert, and up-convert.

16. The apparatus of claim 14, the at least one module comprises a sub-process associated with a process performed by the secondary means.

17. The apparatus of claim 13, each module is configured to process at least one of global navigation satellite system (GNSS) signals, wireless wide area network (WWAN) communication signals, Wi-Fi communication signals, and Bluetooth communication signals.

18. The apparatus of claim 13, each of the first antenna and the third antenna is configured to receive signals in at least one of a global navigation satellite system (GNSS) frequency band, a wireless wide area network (WWAN) communication frequency band, a Wi-Fi communication band, and a Bluetooth communication band.

19. The apparatus of claim 13, the first antenna and the third antenna are configured to receive signals having the same or different frequency.

20. The apparatus of claim 12, the secondary means for processing analog signals positioned within the apparatus to reduce trace loss associated with the analog antenna signals received from the first antenna.

* * * * *